(12) United States Patent
Strydom et al.

(10) Patent No.: US 8,587,274 B2
(45) Date of Patent: Nov. 19, 2013

(54) FEEDBACK CONTROL OF A DC/DC POWER CONVERTER

(75) Inventors: Johan Strydom, Santa Clara, CA (US); Yiding (Eric) Gu, Pleasanton, CA (US)

(73) Assignee: Linear Technology Corporation, Milpitas, CA (US)

( * ) Notice: Subject to any disclaimer, the term of this patent is extended or adjusted under 35 U.S.C. 154(b) by 750 days.

(21) Appl. No.: 12/561,912

(22) Filed: Sep. 17, 2009

(65) Prior Publication Data
US 2011/0062929 A1 Mar. 17, 2011

(51) Int. Cl.
*G05F 1/40* (2006.01)
(52) U.S. Cl.
USPC .......................... 323/282; 323/285
(58) Field of Classification Search
USPC ............................ 323/265, 266, 284, 282, 285
See application file for complete search history.

(56) References Cited

U.S. PATENT DOCUMENTS

| 6,753,723 | B2 | 6/2004 | Zhang |
| 7,400,118 | B1 | 7/2008 | Zhang et al. |
| 7,471,133 | B1* | 12/2008 | Moussaoui et al. ........... 327/172 |
| 7,902,800 | B2* | 3/2011 | Jain et al. ...................... 323/224 |
| 7,948,224 | B2* | 5/2011 | Ng et al. ....................... 323/284 |
| 2004/0232900 | A1 | 11/2004 | Huang |
| 2005/0002134 | A1 | 1/2005 | Ohtake et al. |
| 2009/0146627 | A1 | 6/2009 | Xia et al. |

OTHER PUBLICATIONS

European Search Report issued in European Patent Application No. EP 10 00 9843, dated Feb. 2, 2011.

* cited by examiner

*Primary Examiner* — Adolf Berhane
*Assistant Examiner* — Yemane Mehari
(74) *Attorney, Agent, or Firm* — McDermott Will & Emery LLP

(57) ABSTRACT

A current mode power conversion system and method are described that provide a stable output voltage and a maximum-limited output current to a load. The system comprises: a feedback control linearly operable so as to control the output voltage across the load during constant load conditions, and non-linearly operable so as to control the output voltage across the load during certain detected changes in load conditions above a predetermined threshold so as to speed up the transient response of the power conversion system.

25 Claims, 1 Drawing Sheet

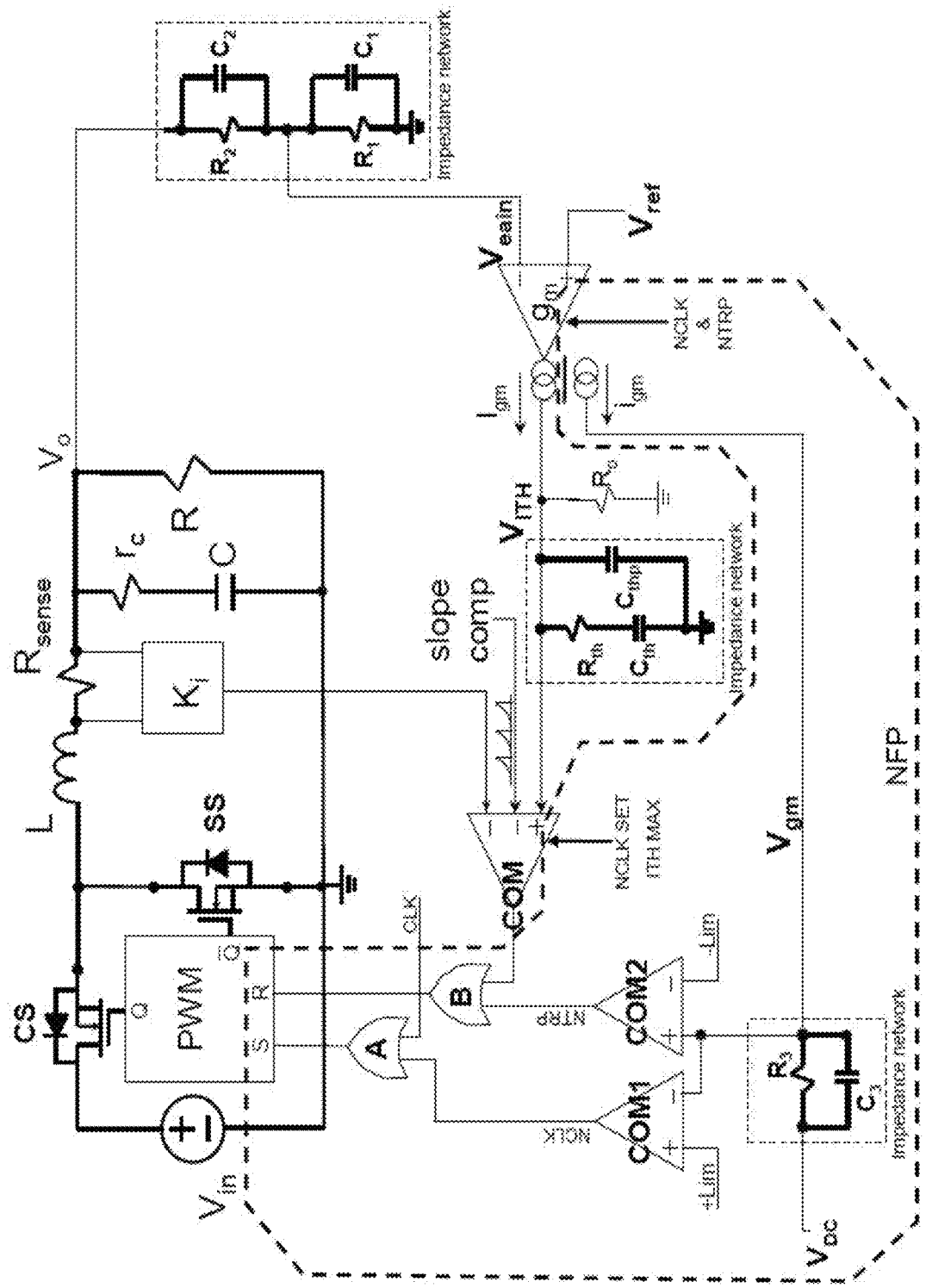

FEEDBACK CONTROL OF A DC/DC POWER CONVERTER

FIELD OF THE DISCLOSURE

The present disclosure relates to DC/DC power converters, and more particularly to a DC/DC power conversion system having an improved transient response during a load change, both during step up and step down output current load transient conditions.

BACKGROUND OF THE DISCLOSURE

DC/DC converters have been popular in industry for many years. Current mode DC/DC power converters include various designs which have been used. Such designs include fixed or constant frequency peak and valley current mode devices. These devices are turned on and off during each cycle at the fixed frequency of operation. There are devices that operate so that either the "on" time (of each cycle) remains constant (on time control), or the off time (of each cycle) remains constant (off time control), i.e., control the duty cycle by controlling the on time or off time of each cycle of control.

These conventional systems normally include an energy storage device, usually in the form of an inductor, so that energy can be stored during the on time of each cycle and used during the off time of each cycle. The converter system is regulated usually by sensing the current through the inductor, not the current through the load. If there is a transient in the load, i.e., it is drawing either more or less current than it was, the converter wants to keep the load voltage constant, and must respond to the transient as quickly as possible. Because the converter senses the current information, it can provide accurate protection against over-current conditions. Converters can be fixed frequency peak or valley current architectures. Further, current mode converters are easy to compensate to insure a stable output when load conditions are stable, and therefore they are easy to use. For example, constant frequency peak current mode controlled architecture provides a natural current limit and is stable over a wide range of input and output conditions. It is also ideally suited for multiphase applications where current sharing and transient response is of greater importance. Increasing current limit beyond maximum load current allows headroom for improved response during transients at heavy load. This headroom however increases the size and rating requirement of the converter power components and leads to a reduced signal to noise ratio under nominal conditions.

Since current mode controlled DC/DC converters limit the output current, they thus act as a current source. During an output load change, initially the current is provided by output capacitors because no converter is fast enough for a sudden and rapid load change. The output will rise/fall depending on the difference between load and inductor current. The controller will sense this change in voltage and turn on the appropriate switch. In the case of the constant frequency peak current mode controlled converter, the worse case happens when the output load increases right after the control switch has just turned off. The converter has to wait for the next clock pulse to turn on the control switch. For a sufficiently high bandwidth converter, this clock latency is the main reason for voltage droop during the transient response for this architecture. Similar latency issues exist in the other current mode architectures for different load transient conditions.

SUMMARY OF THE DISCLOSURE

It is desirable to improve the transient response of a current mode controlled DC/DC converter, but still keep the enormous benefits of current mode control. This improved transient response needs to also be beneficial to both constant on-time and off-time current mode architecture and improve the asymmetric transient response typically associated with these architectures.

Since this transient control mode improves clock latency, non-hysteretic voltage mode controllers can also benefit from this approach.

The disclosure describes a process of power conversion and a current mode power conversion system constructed to provide a stable output voltage and a maximum-limited output current to a load. The system comprises a feedback control operable in a first mode for controlling the output current to the load during constant load conditions, and in a second mode for controlling the output current to the load during changes in load conditions, wherein the feedback control of the second mode overrides the control of the first mode when a change in load conditions is detected so as to speed up the response of the feedback control.

GENERAL DESCRIPTION OF THE DRAWINGS

FIG. 1 shows one embodiment of a DC/DC power converter incorporating improved feedback control.

DETAILED DESCRIPTION OF THE DRAWINGS

The embodiment shown in FIG. 1 detects a load transient in a simple and timely manner that requires no additional external sensing circuitry/components or additional IC pins. The embodiment also provides a new mode of control that operates only during load transient conditions providing an improved transient response. Further, the embodiment allows for a simple adjustment of the threshold for mode transition between linear and non-linear control. Finally, the FIG. 1 embodiment includes a nonlinear control aspect that shortens the nonlinear control duration, by speeding up the linear circuit response while the non-linear control circuit is in command.

The illustrated embodiment of FIG. 1 shows a peak current mode controller which has been modified accordingly, but it should be understood that the improvements will apply to any current mode controller including peak current (senses up ramp for maximum value), valley current (senses down ramp for minimum value) and average current (average of the maximum and minimum) converter systems. Peak and valley converters assume that the operating frequency remains constant. There are also converters that operate so that either the on time remains constant (for constant on-time control), or the off time remains constant (for constant off-time control), i.e., control the duty cycle by controlling the on time or off time of the on switch. These improvements will apply to these constant on/off time controllers as well.

The illustrated embodiment senses the current in the system (i.e., through the inductor), not the current through the load. If there is a transient in the load (i.e., it is drawing either more or less current than it was), the converter will try to keep the load voltage constant, and will respond to the transient as quickly as possible. However, with a fixed frequency controller (peak or valley type), there is an inherent latency to the response to the transient because prior art constant frequency peak and valley devices only make a decision once a clock cycle. The same is true for constant on/off time controllers as well.

Note that the converter will try to keep the output voltage constant regardless of how much output current is required. Every time there is a change in load current the converter needs to adjust and the output voltage will have some fluctuation on it. This is referred to as the transient response of the converter output voltage. One wants to minimize the fluctuations in the output voltage.

The present embodiment shown in FIG. 1 improves the transient control mode by eliminating clock latency. Since this transient control mode eliminates clock latency, non-hysteretic voltage mode converters can also benefit from this approach.

As illustrated in FIG. 1, Vo is sensed through the network comprising R1, R2, C1 and C2. R1 and R2 form a resistor divider to scale the signal Vo to make it proportional to Vref. Capacitors C1 and C2 are provided to make the divider frequency dependent. This frequency dependent scaled version of Vo is designated V$_{EAIN}$. The controller senses V$_{EAIN}$ and compares it to a reference voltage Vref at the input of the error amplifier gm (shown as a trans-conductance (gm) amplifier). Thus, the controller senses V$_{EAIN}$ (applied to the inverting input of the error op-amp gm)—a frequency dependent scaled version of the output voltage Vo. This works because the error amplifier is a trans-conductance amplifier. An operational amplifier would form a virtual ground at the inverting input and the signal would not be proportional to Vo. The input signal V$_{EAIN}$ is compared to the Vref signal, the latter being applied to the non-inverting input of the gm amplifier. The output error signal, current Igm is proportional to the difference between V$_{EAIN}$ and Vref and is applied to a first feedback path. The output impedance of the current amplifier is Ro (shown as a resistor between the output of the error amplifier and system ground in FIG. 1). A compensation network comprising of a resistor/capacitor network creates a frequency dependent impedance between the output of the error amplifier and system ground. The higher the output impedance, the higher the DC converter loop gain. The compensation network determines the transfer function that provides a finite gain at DC, and a variable (but eventually decreasing) gain as the frequency increases. This compensation network makes the control loop stable by adding multiple poles and zeros to the first control loop.

The result is a voltage Vith that is proportional to the compensated version of the voltage error. That voltage is applied to the non-inverting input of the comparator so that it can be compared to a voltage applied to the inverting input of the comparator representing the actual current through the inductor or the current sense element. The actual signal measured is that current flowing through Rsense, and is scaled by the gain Ki. The comparator also sees an artificially added slope compensation signal at the inverting input that suppresses sub-harmonic oscillation, particularly at higher duty cycles. Current can be sensed in any way including but not limited to voltage across a resistor, inductor DCR sensing etc. and does not affect the control loop.

The voltage Vith can be viewed as a set point, making it desirable that the voltage representing the current through the Rsense of the converter is equal to the set point set by Vith (ignoring the slope compensation signal). When the current through the resistor Rsense results in a voltage (adjusted by the gain Ki) being applied to an inverting input of the comparator COM that is equal to the voltage Vith, the converter is at the cross over point where the converter will switch from an on state to an off state. This usually occurs before the expiration of the clock cycle. The cross over occurs because the output of the comparator COM changes from one state to another. Considering only the components discussed thus far and connecting this signal directly applied to the pulse width modulator (PWM) control block, it would from a normal peak current mode controller. The PWM control block will cause the control switch CS to turn on at the beginning of the cycle when the voltage representing the current though the converter is below the set point Vith. The control switch CS and synchronous switch SS are complimentary. It is noted that this converter as shown is one of fixed frequency, with each cycle starting when the control switch CS receives the signal from the PWM, but will switch off within a clock cycle when the error signal Vith, adjusted for the slope compensation, exceeds the current through the sensing resistor. The comparator thus determines the duty cycle. The control switch CS is typically a transistor such as an FET, while the synchronous switch SS can be a transistor such as a FET, a diode, or other similar device. This will result in the current through Rsense ramping down, until the start of the next cycle. The control process is repeated through each cycle, where the converter will try to make the voltage representing the sensed current equal to the error voltage Vith. The result is that converter keeps the output voltage Vo under control. The feedback thus described forms the basis of the first (linear) mode of operation.

In order to reduce the effect of this clock latency, the converter shown in FIG. 1 is also constructed and arranged to provide non-linear control. In order to provide non-linear control, the converter is also constructed and arranged so as to detect when a load transient has occurred. If the V$_{EAIN}$ voltage changes significantly in a short time, a transient has occurred. When a load transient has occurred, the device is constructed so that the non-linear control overrides the gating of the control switch CS and the synchronous switch SS. The converter indirectly detects when a current transient occurs by measuring a change in the V$_{EAIN}$ voltage, i.e., without measuring the load current.

It should be noted that the FIG. 1 embodiment operates so that when the non-linear control overrides the gating of the control and synchronous switches CS and SS, the linear control continues to run. It is not turned off or disabled, but instead is being overridden by the nonlinear control. The nonlinear loop is provided to eliminate the inherent latency that results from having to wait until the end of each cycle when operating in the linear control during transient conditions. Thus, the device is capable of making more than one switching decision per cycle.

Referring again the FIG. 1, a current mirror CM or similar device for duplicating the output of error amplifier (gm) is provided at the output of the error amplifier so as to generate the output current Igm along a second (nonlinear) feedback path, designated at NFP. Further, while a current mirror is used at the output of the error amplifier to provide the current Igm for both the linear and non-linear controls, alternatively, two error amplifiers, one for each feedback control (linear and nonlinear) can be used, each with its own gain setting. The current Igm is transmitted to a "transient detector" impedance network, which in the embodiment shown includes a network comprising a resistor R3 and capacitor C3 connected in parallel. A DC voltage source is used to apply a bias voltage to node Vgm. The value of the resistor will set the sensitivity of the non-linear control. The capacitor C3 introduces a frequency dependent component of the detected signal. This allows the non-linear control to work during transients. The larger the resistor, the more sensitive the nonlinear control. The resistor thus sets the gain of the non-linear control. The capacitor is used to filter the noise (although fundamentally it is not required, but it does allow for frequency dependent gain) so that the loop will not respond to conditions attributed solely to noise. Once the values of the resistor and capacitor are set, they provide a given or established gain. Thus, if the resistor is relatively large, the non-linear control can work practically all of the time, while setting the resistor to zero would result in the non-linear control not working at all. Stated in another way, the current Igm is proportional to the instantaneous changes in the error amplifier input voltage (V$_{EAIN}$). The voltage (Vgm-VDC) across the resistor R3 is proportional to Igm. This voltage is applied to the non-inverting input of comparator COM1 and the inverting input of comparator COM2. Comparators COM1 and COM2 form a discriminator having a high and low threshold limits, and thus are shown as receiving the threshold reference signals (voltages) +Lim and −Lim (respectively representing the upper voltage (VH) and lower voltage (VL) limits) at the inverting and non-inverting inputs of comparators COM1 and COM2. Those limits are fixed during operation. Instead of changing the gain (by changing the value of resistor R3 of the network), one can change the range of VH and VL, by bringing the values of the two reference voltages closer or moving them further away from one another. The two adjustments are equivalent, although increasing the sensitivity by increasing the value of resistor R3 increases the converter's sensitivity to noise, it nevertheless is less practical approach than changing the range of VH and VL. In practice either of both adjustments can be made.

If the voltage Vgm (again proportional to the current Igm) applied to the comparators COM1 and COM2 falls outside the range set by VH and VL (either too high or too low), the condition exits that requires the use of the non-linear control, and the non-linear control is activated. But if voltage Vgm is within the range (between VH and VL), the non-linear detection will not provide a response, and the device will continue to be controlled by the linear controller. So in the absence of transients, the non-linear control has no affect on the operation of the device. Thus, the non-linear control will ignore the ripple that is present during non-transient conditions.

The output of the comparator COM 2 is connected to the input of the logic OR gate B. If the signal Vgm is less than the threshold top limit VH, the output applied to the OR gate B is a logic state low, and the OR gate B will not respond. If, however, the signal Vgm exceeds the top limit VH, the comparator COM 2 produces the signal NCLK as a logic high signal. This logic high signal NCLK is applied to a logic OR gate B. This gate also receives the converter's clocking signal CLK. Thus, the output of the OR gate provides a logic high signal to the PWM, which in turn provides a signal to the control switch CS, either during the beginning of a clock signal, or when the voltage V exceeds VH (+Lim). If the output of OR gate B goes to a logic high in response to the output COM2, as thus the signal NCLK, going high, the converter has yet to complete the linear cycle of operation, and the converter will then go into non-linear mode of operation. Another way of looking at it: If there has been a transient, and it is desirable to close the control switch CS before the end of the current clock cycle and the start of the next (eliminate the clock latency inherent with the fixed frequency converter).

While the device overrides the linear control with the non-linear control, it basically decides when to turn the switches on and off. In addition to overriding the linear control, it would also override the peak current loop, thus losing peak current protection. A way to overcome this is to add in the current limit when the non-linear control is activated. Accordingly, even if the signal NCLK tells the converter to turn the control switch CS on, the current comparator COM can be adapted to receive the NCLK (shown as NCLK SET ITH MAX signal) so that if ITH MAX is reached, the non-linear control will be turned off, and the device continue to operate under the linear control until the next clock cycle. Thus the gate will remain ON until either (1) the signal Vgm falls within the range set by VH and VL, or (2) the maximum current limit is reached.

The OR gate outputs of A and B normally go to a SR latch with reset dominant. This means that comparator output A will override B as long as A is logic High. This is how the converter maintains maximum current limit under all conditions.

Conversely, if the cycle has started with the control switch CS on, but the voltage Vgm crosses below the lower negative limit, VL, the output of the comparator COM 1 (NTRP) will go to a logic high state, and apply its output to the input of OR gate A. The output of OR gate A will then turn on the synchronous switch SS, which causes the control switch CS to turn off since the in one embodiment the two switches CS and SS will always be in an opposite phase with respect to one another. Alternatively, in another embodiment, both switches CS and SS can be turned off during this interval to further improve the transient response.

If the non-linear control loop works well, i.e., the R3 gain is set high enough so that the transient detector is insensitive to ripple, but respond rapidly to transients, then the output voltage variation will be significantly reduced. If the output variation is reduced, then Igm becomes smaller. When a transient occurs, the voltage Vith changes (raises or falls) and the nonlinear control takes over. Under these conditions the voltage Vith will seek and reach a new equilibrium voltage (related to the new load current). The better the non-linear control works, the slower the non-linear control brings Vith to the new equilibrium. As long as the non-linear control is operating, the linear control does not control the operation of the converter. Once the non-linear loop is running, one of the output of the OR gates A and B, i.e., the signals NCLK and NTRP, goes high.

In accordance with another aspect, the signals NCLK and NTRP can be applied to the error amplifier for increasing the gain of the error amplifier gm when one of these two signals goes high. Increasing the gain of the amplifier gm allows the non-linear loop to transit more quickly so that the linear loop can take over control as quickly as possible. When it does, the NTRP and NCLK signals will then both be in a low state, and the gain of the amplifier gm will then go back to its lower value. The preferred method allows the gain gm to go between one of two values (a step function) depending on whether both NTRP and NCLK are low, or one of the signals goes high. It is possible to use different gain values for NTRP and NCLK respectively.

The foregoing describes a power converter that improves the transient response of a current mode controlled DC/DC converter, but still retains the enormous benefits of current mode control. This improved transient response is also beneficial to both constant on-time and off-time current mode architecture and improves the asymmetric transient response typically associated with these architectures. Since this transient control mode improves clock latency, non-hysteretic voltage mode controllers can also benefit from this approach. The disclosure describes a process of power conversion and a current mode power conversion system constructed to provide a stable output voltage and a maximum-limited output current to a load.

While there has been illustrated and described particular embodiments of the present disclosure, it will be appreciated that numerous changes and modifications will occur to those skilled in the art. Accordingly, it is intended that the appended claims cover all those changes and modifications which fall within the spirit and scope of the present disclosure.

What is claimed is:

1. A current mode power conversion system constructed to provide a stable output voltage and a maximum-limited output current to a load, the system comprising:
a linear feedback control configured and arranged so as to control the output current of the current mode power conversion system and operable in a linear mode so as to provide a linear response with a controllable clock duration when controlling the output current during constant load conditions, wherein the linear feedback control includes a non-linear control configured to operate the linear feedback control in a non-linear mode only during load transient conditions above a predetermined threshold by shortening the control duration by speeding up the linear feedback control during changes in load conditions above the predetermined threshold so as to control the output current and speed up the transient response of the power conversion system during such changes so as to avoid clock latency when returning to linear operation;
wherein the linear feedback control is configured and arranged to that the sensitivity of the non-linear control to load transient conditions is adjustable, and where the linear feedback control includes a discriminator configured and arranged to set high and low threshold limits, wherein the sensitivity of the non-near control to load transient conditions is a function of the level of the high and low threshold limits.

2. A current mode power conversion system of claim 1, wherein the non-linear control includes a detector constructed and arranged so as to detect a change in load conditions, the non-linear control being responsive to the detector for switching the linear feedback control to a nonlinear mode of operation when the detector detects a change in load conditions (positive or negative) greater than the predetermined threshold.

3. A current mode power conversion system of claim 2, wherein the detector includes a threshold detector constructed and arranged so as to detect changes in the load conditions which exceed the predetermined threshold.

4. A current mode power conversion system of claim 2, wherein the detector includes a threshold detector for detecting changes in an error signal derived as a function of the voltage across the load and a reference signal, wherein the feedback control responds to this error signal.

5. A current mode power conversion system according to claim 4, wherein the error signal is modified by a frequency dependent gain so as to distinguish between changes in load conditions and noise.

6. A current mode power conversion system according to claim 5, wherein the feedback control includes an impedance driver network constructed to modify the error signal as a function of the frequency of the voltage across the load.

7. A current mode power conversion system of claim 4, wherein the feedback control includes at least two feedback paths both responsive to the error signal, wherein one of the feedback paths provides feedback control for regulating the output voltage during linear operation, and the other of the feedback paths provides nonlinear control for speeding up the regulation of the output voltage during non-linear operation.

8. A current mode power conversion system of claim 7, further including a circuit for duplicating the error signal from one feedback path so that it is generated in the other of the feedback paths.

9. A current mode power conversion system of claim 8, wherein one of the error signals is processed in accordance with a frequency dependent function of the error signal.

10. A current mode power conversion system of claim 8, wherein the circuit for duplicating the error signal includes a current mirror.

11. A current mode power conversion system of claim 8, wherein the circuit includes at least one amplifier constructed to amplify a signal as a function of the voltage across the load.

12. A current mode power conversion system of claim 11, wherein the circuit includes a second amplifier constructed to amplify the signal as a function of the voltage across the load.

13. A current mode power conversion system of claim 1, wherein the feedback control includes at least two feedback paths both responsive to an error signal, wherein one of the feedback paths provides feedback control for regulating the output voltage during linear operation, and the other of the feedback paths provides feedback control for speeding up the regulation of the output voltage during non-linear operation.

14. A current mode power conversion system of claim 13, wherein the feedback control includes an error amplifier for generating an error signal as a function of the output voltage and a reference signal, wherein the amplifier is set at one gain during linear operation and set for a second gain, larger than the first gain, during nonlinear operation.

15. A current mode power conversion system of claim 14, wherein the feedback control includes at least two feedback paths, one for linear operation and the other for nonlinear operation, wherein the error signal is duplicated so that it is generated in both of the feedback paths, and wherein the feedback path of linear operation continues to operate during nonlinear operation.

16. A current mode power conversion system of claim 13, further including a threshold detector constructed to generating an activation signal to activate the nonlinear operation in response to either a positive or negative change in an error signal, the absolute of which is greater than a threshold, the error signal being a function of the output voltage and a reference signal.

17. A current mode power conversion system of claim 16, wherein the threshold is adjustable.

18. A current mode power conversion system according to claim 1, further including a control switch and a synchronous switch configure to operate together to regulate the output voltage, wherein the power conversion system changes from linear operation to nonlinear operation when (a) a control switch is turned on in response to a threshold detector detecting a positive change in an error signal above the corresponding threshold, and (b) either the synchronous switch is turned off or the control and synchronous switches are both turned off in response to the threshold detector detecting a negative change in the error signal, the absolute of which is greater than its corresponding threshold.

19. A current mode power conversion system according to claim 18, wherein the converter system changes from nonlinear operation to linear operation when the threshold detector no longer detects a positive change above its corresponding threshold and a negative change above its corresponding threshold.

20. A current mode power conversion system according to claim 1, wherein the power conversion system includes circuitry for controlling a peak current limit during both linear and nonlinear operation.

21. A current mode power conversion system according to claim 20, further including a control switch and a synchronous switch that operate together to regulate the output voltage, wherein the circuitry for controlling a peak current limit overrides the power conversion system during both linear and nonlinear operation.

22. A current mode power conversion system according to claim 21, wherein the circuitry for controlling a peak current limit is responsive to a first reference signal during linear operation, and is responsive to a second reference signal during nonlinear operation.

23. A current mode power conversion system of claim 1, wherein linear feedback control includes a resistor configured and arranged to set the gain of the non-linear control as a function of the value of the resistor.

24. A current mode power conversion system of claim 1, wherein linear feedback control includes a resistor and a capacitor arranged as a network and configured and arranged to set the gain of the non-linear control as a function of the value of the resistor and capacitor.

25. A method of providing a stable output voltage and a maximum-limited output current to a load, the method comprising:
   maintaining the output voltage across the load using linear feedback during constant load conditions, and accelerating the linear feedback response while using nonlinear feedback when the changes in load conditions above a predetermined threshold are detected so as to avoid clock latency when returning to linear operation;
   wherein the sensitivity to transient conditions of when to accelerate the linear feedback response is adjustable when detecting changes in load conditions, while being insensitive to ripples in the output voltage.

\* \* \* \* \*